(No Model.)  2 Sheets—Sheet 1.

S. COBURN.
PIPE COUPLING MACHINE.

No. 327,765.  Patented Oct. 6, 1885.

Attest:
A. W. Bright
J. W. M'Hister

Inventor:
Samuel Coburn,
by F. B. Brock,
Atty.

N. PETERS, Photo-Lithographer, Washington, D. C.

(No Model.)  2 Sheets—Sheet 2.

S. COBURN.
PIPE COUPLING MACHINE.

No. 327,765.  Patented Oct. 6, 1885.

Attest:
L. B. Brock
W. E. Chaffee

Inventor:
Samuel Coburn
by F. B. Brock
Atty.

UNITED STATES PATENT OFFICE.

SAMUEL COBURN, OF ALTOONA, PENNSYLVANIA.

PIPE-COUPLING MACHINE.

SPECIFICATION forming part of Letters Patent No. 327,765, dated October 6, 1885.

Application filed February 20, 1885. Serial No. 156,554. (No model.)

*To all whom it may concern:*

Be it known that I, SAMUEL COBURN, a citizen of the United States, residing at Altoona, in the county of Blair and State of Pennsylvania, have invented certain new and useful Improvements in Pipe-Coupling Machines; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

My improvement relates to metal-working tools.

The object of the present improvement is to couple the ends of large iron pipe in an expeditious and more economical manner than that at present in vogue. My invention is more particularly designed for making the joints in the iron mains which are used for the conducting of natural gas from the gas-wells of the oil regions. I do not, however, confine the application of my improvement to the coupling of natural-gas mains, as its use may be extended to the coupling together of the meeting ends of any screw-threaded pipe.

Heretofore, in the laying of natural-gas mains, where the pipe-sections are screwed together, it has been common to connect the pipes by means of huge pipe-tong devices. The pipes used in the mains are generally from eight to ten inches in diameter and twelve to fifteen feet in length. In the operation of coupling these heavy pipes together from fifteen to twenty men are employed with as many tongs as can be conveniently used to turn the pipe.

To remedy and simplify the method of coupling these pipes my invention has been designed. By its use the pipes can be better secured in making the joints, thereby obviating the danger now existing from leaky joints. This danger of leaking pipes is a very serious one, as is evidenced by the recent explosions which have occurred. To effect these objects my invention consists in the following construction and arrangement, which will first be fully described, and the points of novelty then indicated in the claims.

Figure 1:
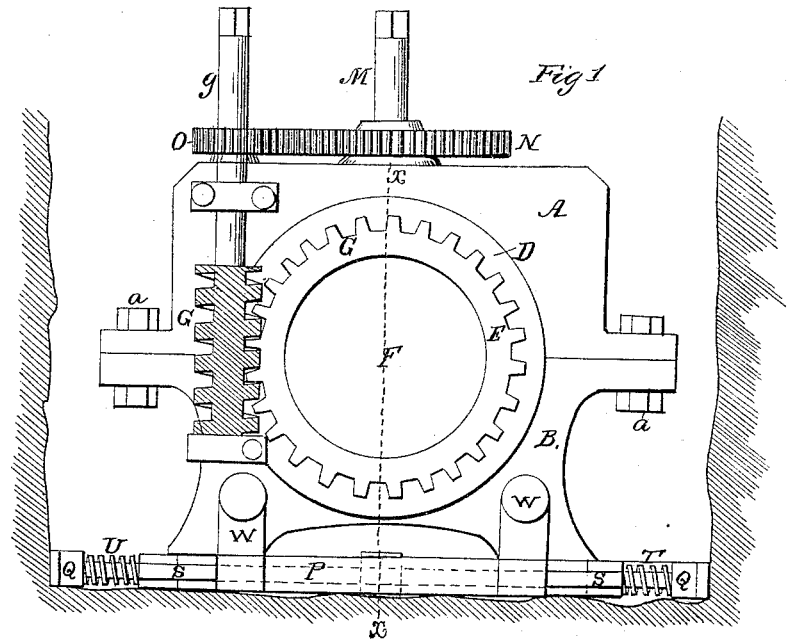
Figure 2:
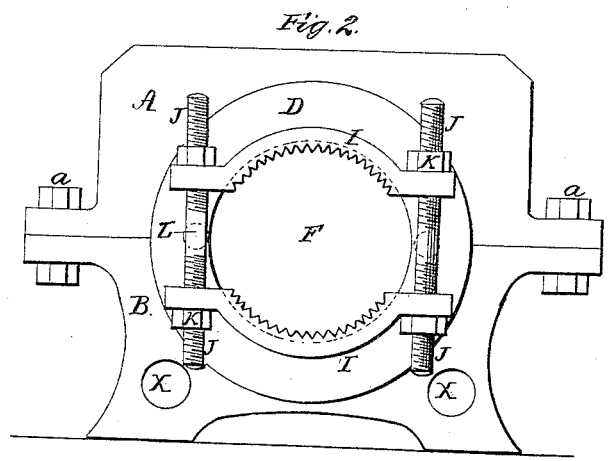
Figure 3:
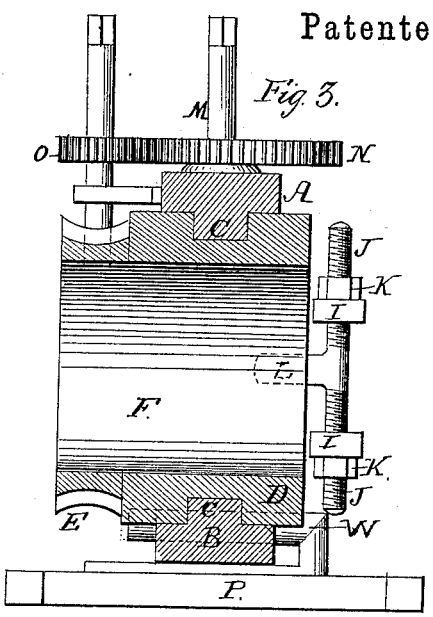
Figure 4:
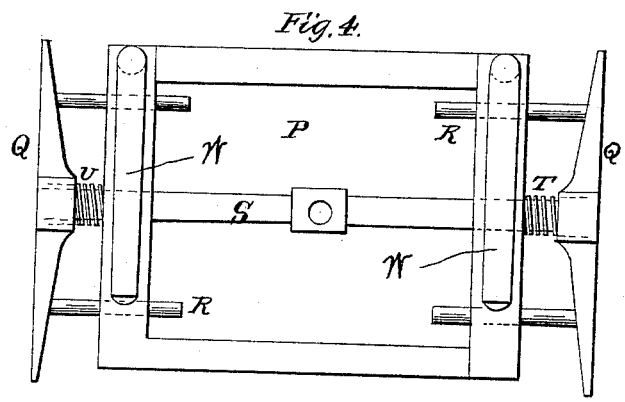

Figure 1 is a front elevation of a machine to which I have applied my improvements. Fig. 2 is a rear elevation of the same. Fig. 3 is a vertical section taken through the line $x$ $x$ of Fig. 1. Fig. 4 is a plan view of a device for steadying the machine within the trench where the coupling of the pipes is made, and Fig. 5 a detail view of the same.

Referring to the drawings, it will be seen that the frame or standard of the machine is composed of two parts horizontally divided and adapted to be bolted together by a series of bolts, $a$.

C is a projecting annular ring formed in both portions of the standard.

D is a wheel having a groove into which takes the annular ring C. The wheel is adapted to revolve within the standard.

E is a worm-wheel adapted to be either cast or to be secured rigidly to the revolving wheel D, so as to turn therewith.

Both the worm-wheel E and wheel D are pierced by a central horizontal opening, which receives the end of the pipe to be coupled. This hole is considerably larger than the pipe to be jointed.

G is a worm journaled in suitable bearings in the top portion A of the standard or bearing, its shaft $g$ being provided with any suitable means for rotating it, such as the hand-wheel H or steam-power. This worm G meshes with the worm-wheel E, causing the wheel D to revolve within the standard-bearing A B. The wheel D can be made in halves if it should be desired.

The jaw-gripping device for seizing the pipe inserted in the machine consists of two approximately semicircular jaws, I I, both of which are vertically adjustable by a series of stationary vertical screws, J J, and movable adjusting-nuts K K. Where the wheel D is in two parts I substitute a gripping-jaw of different construction from the one shown and described. I do not, therefore, limit myself to any particular formation of jaws. The screws on each side of the gripping device are formed in one piece, which at its mid-length is provided with a screw-threaded offset, L, adapted to be screwed into the revolving wheel D. The vertical screws J J and the horizontally-projecting offset L on either side form a T-shaped casting or forging.

Figure 5:
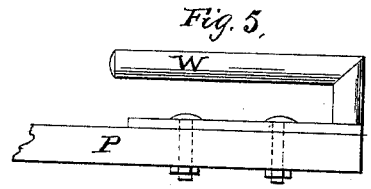

I have shown two points from which power may be applied for the purpose of revolving the gripping-jaws in the operation of coupling the pipe. One method is to apply the power direct to the worm-shaft G, and the other method is to apply the power through a counter-shaft, M, journaled in the standards having a gear-wheel, N, which meshes with a pinion, O, upon the worm-shaft. Both the worm-shaft and the counter shaft may have squared ends upon which a hand-wheel may be removably placed; but other means may be employed for giving motion to these shafts, as before described.

Where the coupling of an underground series of pipes is made I propose to use a bed-plate for the purpose of securing a rigid setting for the coupling-machine. This frame or bed is shown in Figs. 4 and 5. It comprises, preferably, a rectangular frame, P, which is made narrower than the trench in which it is placed.

Q Q are binding-strips, which have a horizontal motion to and from the frame P, they being kept in place by guide-rods R R, which pass through horizontal holes in the frame. S is a right and left screw-shaft passing horizontally through the center of the bed-plate, the right-hand thread T of which takes into a corresponding thread in the binding-plate Q, and the left-hand thread U takes into a corresponding thread in the other binding-plate. A rotary motion for the purpose of advancing or receding these binding-plates is given the shaft by any suitable means.

W W are two guide-shafts which are strongly bolted to the bed-plate P. These rods secure and hold the coupling machine against any transverse displacement, and at the same time allow of a backward or forward sliding movement of the machine upon the rods in order to compensate for any endwise movement of the pipe when being screwed into the coupling, which is an important requisite. One end of the guide-rods W is left free for their ready insertion into the guide holes X of the standard B.

In operation the bed-plate is first let down into the trench and the binding-plates advanced until they bear against the sides of the trench, thus firmly securing the bed-plate in the bottom of the trench. The lower portion of the standard of the machine is then slipped upon the guide-shafts W, when the machine itself is adjusted in position either by slipping it on the pipe or by unbolting the standard and placing the machine thereon. When the pipe to be jointed is passed through the central opening, F, and within the jaws I I, the latter are brought into engagement with the pipe by means of the adjusting screws and nuts, and the pipe held firmly therein. By turning the worm G the wheel D is revolved by means of its connection with the worm-wheel E, and, as the pipe-jaws are carried by this wheel, the pipe is thus screwed into its coupling by a steady, powerful, and easily-controlled force. In screwing the pipe at one end its opposite end may be supported in any convenient way, or such end may rest within another of my improved machines in order to give it absolute steadiness.

I do not limit my invention to the use of the worm and worm-wheel for giving the wheel D its rotary motion, as I may employ other mechanical devices which will effect the same purpose.

Having described my invention, what I claim as new, and desire to secure by Letters Patent, is—

1. In a pipe-coupling machine, a standard composed of an upper and lower part removably bolted together, a revolving wheel having bearings in the standard and provided with a central opening, and a jaw-clamping device carried by the wheel and having an opening in line with the opening in the wheel, all constructed to act in combination so that the standard may be taken apart to facilitate the shifting of the machine, as set forth.

2. In a pipe-coupling machine, a standard composed of two parts removably bolted together and having an annular recessed bearing for the jaw-clamping wheel, an interior wheel having an annular collar or boss taking into the recess in the standard and provided with a central opening, a jaw-clamping device carried by the wheel, and means, as described, for imparting motion to the machine, substantially as set forth.

3. A bed-plate, oppositely-arranged adjustable binding-plates located thereon, and guides carried thereby, in combination with a pipe-coupling machine adapted to rest and move upon the guides, substantially as shown and described.

In testimony whereof I affix my signature in presence of two witnesses.

SAMUEL COBURN.

Witnesses:
F. B. BROCK,
WM. M. CAMMON.